United States Patent
Huynh Thien et al.

(10) Patent No.: US 11,490,048 B2
(45) Date of Patent: *Nov. 1, 2022

(54) INTELLIGENT VIDEO REFRAMING

(71) Applicant: Adobe Inc., San Jose, CA (US)

(72) Inventors: Nicolas Huynh Thien, San Francisco, CA (US); William Marino, San Jose, CA (US); Oliver Wang, Seattle, WA (US); Nico Alexander Becherer, Hamburg (DE); Allison Breanne Walke, Carlsbad, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/217,951

(22) Filed: Mar. 30, 2021

(65) Prior Publication Data
US 2021/0218929 A1 Jul. 15, 2021

Related U.S. Application Data

(63) Continuation of application No. 16/359,876, filed on Mar. 20, 2019, now Pat. No. 10,986,308.

(51) Int. Cl.
*H04N 7/01* (2006.01)
*H04N 5/262* (2006.01)

(52) U.S. Cl.
CPC ......... *H04N 7/0122* (2013.01); *H04N 5/2628* (2013.01)

(58) Field of Classification Search
CPC ............... H04N 7/0122; H04N 5/2628; H04N 21/23418; H04N 21/234372; G11B 27/031; G11B 27/28
See application file for complete search history.

(56) References Cited

U.S. PATENT DOCUMENTS

| 6,075,905 | A | 6/2000 | Herman et al. |
| 9,571,786 | B1 | 2/2017 | Zimmer et al. |
| 10,609,284 | B2 | 3/2020 | Herman et al. |
| 10,986,308 | B2 * | 4/2021 | Huynh Thien ............... H04N 21/234372 |
| 2004/0146197 | A1 | 7/2004 | Piponi |
| 2007/0061862 | A1 | 3/2007 | Berger et al. |
| 2008/0291265 | A1 * | 11/2008 | Wagner .................. H04N 7/152 348/14.16 |

(Continued)

OTHER PUBLICATIONS

Kummerer, M., et al., "DeepGaze II: Reading fixations from deep features trained on object recognition", arXiv preprint arXiv:1610.01563, pp. 1-16 (Oct. 2016).

*Primary Examiner* — Paulos M Natnael
(74) *Attorney, Agent, or Firm* — Shook, Hardy & Bacon LLP

(57) ABSTRACT

Embodiments of the present invention are directed towards reframing videos from one aspect ratio to another aspect ratio while maintaining visibility of regions of interest. A set of regions of interest are determined in frames in a video with a first aspect ratio. The set of regions of interest can be used to estimate an initial camera path. An optimal camera path is determined by leveraging the identified regions of interest using the initial camera path. Sub crops with a second aspect ratio different from the first aspect ratio of the video are identified. The sub crops are placed as designated using the optimal camera path to generate a cropped video with the second aspect ratio.

18 Claims, 13 Drawing Sheets

(56) References Cited

U.S. PATENT DOCUMENTS

| | | |
|---|---|---|
| 2011/0199536 A1 | 8/2011 | Wolf et al. |
| 2012/0002112 A1 | 1/2012 | Huang et al. |
| 2014/0354764 A1 | 12/2014 | Avni et al. |
| 2017/0118540 A1 | 4/2017 | Thomas et al. |
| 2017/0244991 A1 | 8/2017 | Aggarwal et al. |
| 2017/0302719 A1* | 10/2017 | Chen .................. H04L 65/4069 |
| 2018/0108158 A1* | 4/2018 | Sharma .................. G06T 11/60 |
| 2018/0115706 A1* | 4/2018 | Kang ........................ G06T 5/50 |
| 2019/0114804 A1 | 4/2019 | Sundaresan et al. |
| 2019/0174063 A1 | 6/2019 | Huang et al. |
| 2019/0182428 A1* | 6/2019 | Huang ............... H04N 5/23254 |
| 2019/0228225 A1 | 7/2019 | Guo et al. |

* cited by examiner

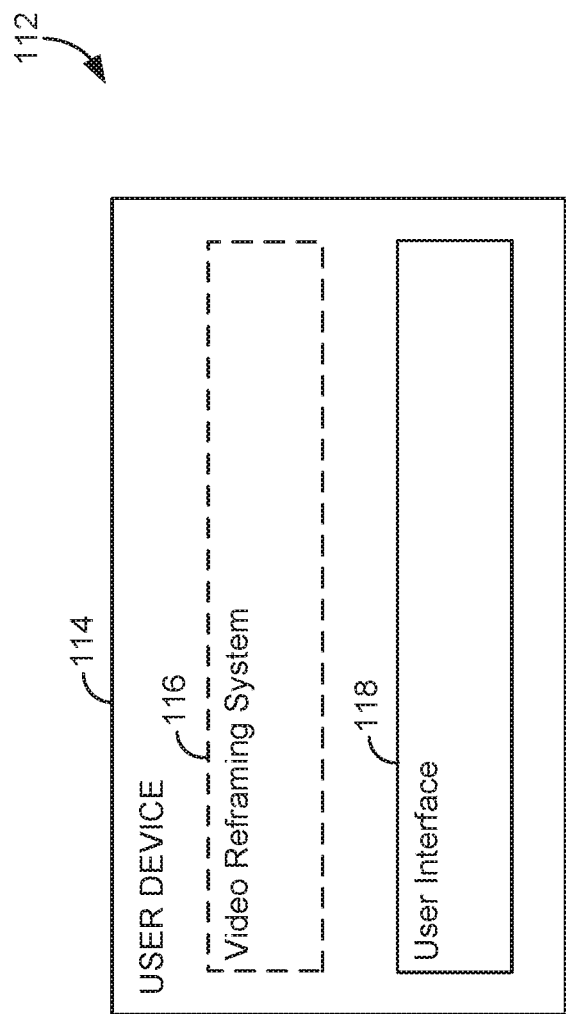

INTELLIGENT VIDEO REFRAMING

CROSS-REFERENCE TO RELATED APPLICATIONS

This application is a continuation application of and claims the benefit of U.S. Non-Provisional application Ser. No. 16/359,876 (Attorney Docket No. P8562-US/39913.319932), filed on Mar. 20, 2019, entitled "INTELLIGENT VIDEO REFRAMING," the entirety of the contents of which are incorporated herein by reference.

BACKGROUND

Users often desire to reframe a video from an initial aspect ratio to a different aspect ratio. An aspect ratio refers to the width of a video in relation to the height of the video and can be expressed in width by height. For instance, various channels (e.g., social media, websites, devices) require videos to be in specific aspect ratios. Accordingly, when a video is posted or played on a particular channel, the video may need to be edited from one aspect ratio to another aspect ratio to reframe the video to the specific aspect ratio for that particular channel.

Conventional methods for converting videos from one aspect ratio to a different aspect ratio have had limited success in ensuring regions of interest are maintained in the cropped video. Manual methods are typically able to maintain regions of interest in a cropped video but require a user to identify key frame parts every few frames. As such, converting a video into a different aspect ratio using manual methods is a time intensive processes that requires knowledge about editing a video into the new aspect ratios. Automatic methods for converting video from one aspect ratio to another ratio aspect have attempted to decrease the amount of time required. However, such methods typically rely on center cropping that ignores key frame parts. In this way, conventional methods are not capable of automatically reframing a video from one aspect ratio to another aspect ratio while maintaining regions of interest and composition from the original video.

SUMMARY

Embodiments of the present invention are directed towards automatically converting a video in one aspect ratio to another aspect ratio using reframing. The videos are reframed in a manner that maintains the integrity of the original video (e.g., visible regions of interest and composition). A camera path is generated by leveraging identified regions of interest for each frame of a video to determine placement of sub crops throughout the video that optimizes the balance between maintaining regions of interest within the visible sub crops while not introducing too much camera movement and/or acceleration. A sub crop is the region at which an original frame is to be cropped to the new aspect ratio (e.g. using a bounding box).

An initial camera path can be estimated that traverses the video from frame to frame based on the placement of sub crops in relation to the regions of interest identified in the frames. The estimated initial camera path can be further modified to generate an optimal camera path that minimizes unnecessary camera movement but maintains visibility of the regions of interest in sub crops. Prior to cropping a video using the sub crops from the optimal camera path, the video reframing system may perform composition preservation by identifying composition based on the relative position of a region of interest in reference to the overall original frame. Upon determining the composition of the original frame, the sub crop of a frame can be shifted to maintain the original composition. Preserving the composition of each frame in the sub crop ensures that the artistic vision of the video creator is maintained from the original video to the reframed video.

BRIEF DESCRIPTION OF THE DRAWINGS

FIG. 1B depicts another example configuration of an operating environment in which some implementations of the present disclosure can be employed, in accordance with various embodiments.

DETAILED DESCRIPTION

Figure 1A:
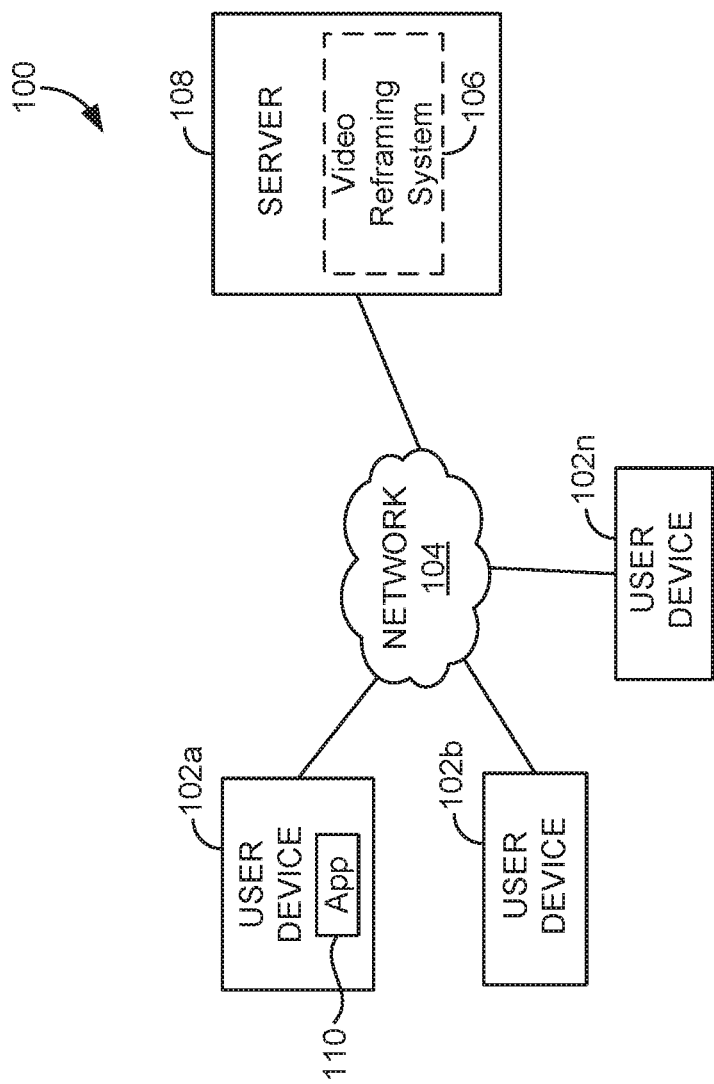
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire to manipulate videos, for example, by converting a video from an original aspect ratio into a different aspect ratio by reframing the video. Reframing a video into a different aspect ratio allows, for instance, the video to be posted and/or played on a channel that does not support the original aspect ratio of the video. A channel can be any one of a social media platform, website, device, and/or any other interface (i.e., hardware and/or software) capable of playing videos. Conventional methods for converting videos have had limited success in efficiently converting videos from one aspect ratio to another aspect ratio while ensuring regions of interest are maintained in the cropped video. Manual methods of converting videos are burdensome and require the user to have expertise in video editing, while automated methods of converting videos fail to maintain regions of interest in frames of cropped videos or otherwise maintain the artistic composition of the original video.

Accordingly, embodiments of the present disclosure present a solution that reframes a video from one aspect ratio to a different aspect ratio while maintaining visibility of regions of interest and maintaining the composition from the original video for each frame. Advantageously, maintaining regions of interest in the cropped video helps preserve the initial artistic vision of the original video. It is also advantageous to preserve the overall composition of the original video for each frame. For example, if a person is standing in the left third of an original frame of the video, the person should be positioned in a cropped frame such that the person is still standing in the left third of the cropped frame.

At a high level, some implementations of the technology described herein determine an optimal camera path for use in reframing a video from one aspect ratio to a different aspect ratio while maintaining visibility of regions of interest and maintaining the composition from the original video for each frame. The camera path attempts to mimic what a human camera operator would do when filming the content of the video. A camera path can indicate the movement from frame to frame in a video that reflect sub crops from the original video to create a video with the new aspect ratio. The camera path is generated by leveraging identified regions of interest for each frame to determine optimal cropped frames throughout the video that maintain regions of interest while minimizing unnecessary camera movement. A region at which a frame is to be cropped can be designated as a sub crop or sub crop frame. A sub crop can be a bounding box designating the visible window from the original frame that reflects a new aspect ratio. Upon cropping a frame using the sub crop, the resulting frame will have the new aspect ratio. The sub crops for each frame can be further modified before cropping a video to preserve composition from the original video. It should be appreciated that in embodiments, the original and new aspect ratio may be the same (e.g., if generating a cropped video by specifying width and height in pixel space to zoom into a video). In such embodiments where cropping can retain the same aspect ratio, portions of the video can be zoomed into while retaining the original aspect ratio.

To reframe a video from one aspect ratio to a new aspect ratio, a video reframing system analyzes a video to identify regions of interest in frames of the video and uses the regions of interest to determine the placement of sub crops for each frame of the video. In this way, visibility of a region of interest in a frame is maintained when placing a sub crop for the frame. A region of interest can comprise an area of a frame that contains meaningful content and/or contains subject matter of the frame. Meaningful content can be designated as content that draws a user's eye to the video frame.

Regions of interest identified for the frames of a video can be used to estimate an initial camera path by placing the sub crop for each frame based on the region of interest for the frame. This initial camera path estimate traverses the video frame-to-frame based on the placement of these sub crops. The estimated initial camera path can be further modified to generate an optimal camera path that minimizes unnecessary camera movement but maintains visibility of the region of interest in the sub crop. More particularly, the optimal camera path can be formulated to balance movement related to static shots, constant velocity panning, and smooth camera transitions while keeping the region of interest visible. This optimal camera path can indicate the optimal sub crops for frames in a video that minimize unnecessary camera movement while maintaining visibility of regions of interest in frames.

Prior to cropping a video using the optimal sub crops, the video reframing system may perform composition preservation. When performing composition preservation, the composition of an original frame can be identified using the relative position of the region of interest in reference to the overall original frame. Upon determining the composition of the original frame, the sub crop of a frame can be shifted to maintain the original composition. Preserving the composition of each frame in the sub crop ensures that the artistic vision of the video creator is maintained from the original video to the reframed video.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1100 described in connection to FIG. 11, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. As an example, application 110 can be any one of ADOBE PREMIERE PRO CC, ADOBE PREMIERE ELEMENTS, ADOBE SPARK VIDEO, ADOBE STOCK, ADOBE AFTER EFFECTS CC, and/or ADOBE ADVERTISING CLOUD.

The application 110 may generally be any application capable of facilitating the exchange of information between the user devices and the server(s) 108 in carrying out converting a video from one aspect ratio to another aspect ratio. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates converting a video from one aspect ratio to another aspect ratio. In embodiments, a video is received that has a first aspect ratio. The video can be selected from a repository, for example, a repository stored in a data store accessible by a network or stored locally at the user device (e.g., user device 102a). Based on the selected video, (e.g., provided via a user device or server), regions of interest are identified in frames of the video, and a camera path is determined using the identified regions of interest. This may include determining an initial camera path from the regions of interest and deriving an optimal camera path from the initial camera path for use in cropping the video from the first aspect ratio to a second aspect ratio. The cropped video can be output to a user, for example, to the user via the user device 102a. In this regard, the cropped video can be displayed via a display screen of the user device. In other embodiments, the optimal camera path can be output to the user. In this aspect, the user can apply the output optimal camera path, and/or modify the camera path prior to reframing the video using cropping.

As described herein, server 108 can facilitate converting a video from one aspect ratio to another aspect ratio via video reframing system 106. Server 108 includes one or more processors, and one or more computer-readable media. The computer-readable media includes computer-readable instructions executable by the one or more processors. The instructions may optionally implement one or more components of video reframing system 106, described in additional detail below.

For cloud-based implementations, the instructions on server 108 may implement one or more components of video reframing system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of video reframing system 106 may be implemented completely on a user device, such as user device 102a. In this case, video reframing system 106 may be embodied at least partially by the instructions corresponding to application 110.

Referring to FIG. 1B, aspects of an illustrative video reframing system are shown, in accordance with various embodiments of the present disclosure. FIG. 1B depicts a user device 114, in accordance with an example embodiment, configured to allow for converting a video from one aspect ratio to another aspect ratio using a video reframing system 116. The user device 114 may be the same or similar to the user device 102a-102n and may be configured to support the video reframing system 116 (as a standalone or networked device). For example, the user device 114 may store and execute software/instructions to facilitate interactions between a user and the video reframing system 116 via the user interface 118 of the user device.

Figure 2:
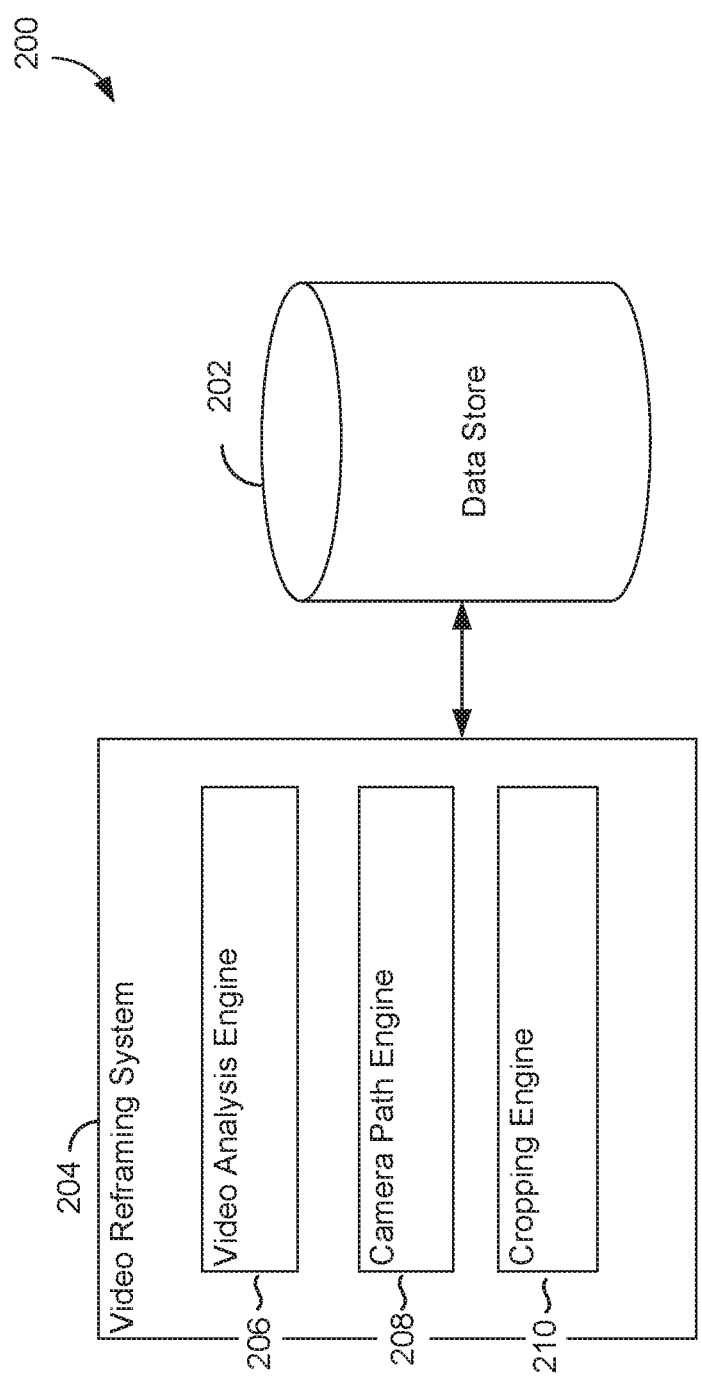
FIG. 2 depicts a further example configuration of an operating environment in which some implementations of the present disclosure can be employed, in accordance with various embodiments of the present disclosure.

FIG. 2 depicts another example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11. It should be understood that operating environment 200 shown in FIG. 2 is an example of one suitable operating environment. Among other components not shown, operating environment 200 includes a number of user devices, networks, and server(s).

Video reframing system 204 includes video analysis engine 206, camera path engine 208, and cropping engine 210. The foregoing engines of video reframing system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the video reframing system 204.

As shown, video reframing system 204 may operate in conjunction with data store 202. Data store 202 can store computer instructions (e.g., software program instructions, routines, or services), data, and/or models used in embodiments described herein. In some implementations, data store 202 can store information or data received via the various engines and/or components of video reframing system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 may include videos, aspect ratios associated with various channels, camera paths determined for videos, and analyzed composition of frames of videos. In some cases, data store 202 receives data from user devices (e.g., a video received by user device 102a or another device associated with a user, via, for example, application 110). In other cases, data is received from one or more data stores in the cloud.

A video is received for reframing by video framing system 204. The video may be received, for instance, from a user at a user device. The user may select or input video in any available manner. For example, a user may film a video using a camera on a device, for example, user device 102a-102n and/or user device 114 of FIGS. 1A-1B. As another example, a user may select a video from a repository stored in a data store accessible by a network or stored locally at the user device 102a-102n and/or user device 114 of FIG. 1A-1B. In other embodiments, a user can input the video by inputting a link or URL to a video. The video framing system 204 reframes the video from one aspect ratio to another aspect ratio.

Video analysis engine 206 analyzes a video. In particular, the video analysis engine 206 can be used to analyze frames of a video to identify regions of interest. A region of interest can comprise an area of a frame that contains meaningful content and/or contains subject matter of the frame. Meaningful content can be designated as content in a video frame of interest to a user. For example, meaningful content can be the main person and/or object in the video frame. Regions of interest can be determined using various methods. For instance, in some implementations, video analysis engine 206 can identify regions of interest based on objects selected by a user. In other implementations, the video analysis engine can identify regions of interest based on automatic identification of human faces using known facial recognition technologies. In further implementations, video analysis engine 206 can identify regions of interest using saliency. Saliency can be defined as an area(s) in an image (e.g., frame of a video) that are determined to be likely to draw a user's eye. Specific methods for determining regions of interest are discussed further with reference to FIG. 4.

Camera path engine 208 determines a camera path for a video. A camera path indicates the movement of sub crops from frame to frame in the video to create the new aspect ratio for the cropped video. In some implementations, the camera path engine 208 determines an initial camera path estimate based on regions of interest identified in frames of the video. The camera path engine 208 then determines an optimal camera path from the initial camera path estimate, as will be described in further detail below. In other embodiments, camera path engine 208 can determine a camera path in a single step.

An initial camera path may be estimated using the region (s) of interest determined for frames of the video. The initial camera path can be estimated by placing the sub crop for a frame around the region of interest for the frame such that the window of visibility of the sub crop centers around the region of interest. More particularly, the initial camera path can take the regions of interest and predict the trajectory of the camera for cropping the video from the original aspect ratio to the new aspect ratio while maintaining visibility the region of interest in each frame. Estimating the initial camera path is discussed further with reference to FIG. 5.

The camera path engine 208 may refine the initial camera path estimate into an optimal camera path. The optimal camera path can be determined by finding the optimal placement of the sub crops for each frame of a video. This optimal placement is based on minimizing unnecessary camera movement while maintaining visibility of the regions of interest in sub crops. For example, in a video of a person shaking their head no (i.e., left to right), an optimal camera path can be determined by preferencing static shots. These statics shots capture the head shaking independently rather than anchoring the sub crop to frame the person's face as it moves frame-to-frame. Such a cropped video will have a different aspect ratio from the original video that captures the full headshake without the video unnecessarily jumping due to sub frames following the face movement back and forth left to right. Other types of video can preference camera movement based on the content of the video. For instance, in an action movie showing a car driving, to maintain visibility of the regions of interest the optimal camera path can be determined by preferencing constant velocity panning shots and/or smooth camera transitions. This constant velocity panning uses sub crops placed such that in the cropped video follows the movement of the car frame-to-frame.

A linear programming approach can be used to perform the optimization of the camera path. As an example, the following equation can be utilized:

$$\phi(P) = \omega_1 |\Delta P|_1 + \omega_2 |\Delta^2 P|_1 + \omega_3 |\Delta^3 P|_1 + \omega_d |P - P_e|_1$$

$\Delta P$, $\Delta^2 P$, $\Delta^3 P$ are first, second, and third derivatives of the optimal camera path and $|P-P_e|$ represents the distance between the desired optimal camera path and the initial camera path estimate. Weights $\omega_1$, $\omega_2$, $\omega_3$, and $\omega_d$ can be used to weight the parameters of the equation to bias towards specific types of camera shots. In particular, a higher $\omega_1$ biases towards more static shots. A higher $\omega_2$ biases towards more constant velocity panning. A higher $\omega_3$ biases towards smoother camera transitions. Finally, a higher $\omega_d$ biases towards staying closer to the initial path. This equation can be optimized to minimize loss where loss is based on unnecessary camera movement. Optimizing the camera path is discussed further with reference to FIGS. 3 and 5.

Cropping engine 210 may be used to reframe a video from one aspect ratio to another aspect ratio. Reframing the video can be performed by cropping the video at each frame into the selected aspect ratio using the camera path determined by the camera path engine 208. Cropping can be performed frame by frame. In further embodiments, cropping the frames can be performed simultaneously.

For a frame of a video, the optimal camera path may be used to identify coordinates where the sub crop area should be placed by the cropping engine 210. In some embodiments, cropping can be performed using this sub crop area. In other embodiments, composition preservation can be performed by cropping engine 210 prior to performing video reframing. When performing composition preservation, the composition of a frame is identified based on the relative position of the region of interest in reference to the overall original frame. Upon determining the composition of the original frame, the sub crop of a frame can be shifted to maintain the original composition. For instance, when there is negative space on one side of the original frame, this will be preserved in the final cropped frame. As an example, if a car is traveling from left to right in a video, as the video is reframed to a new aspect ratio, the movement of the car going left to right will be maintained by preserving the composition of the car in each frame (i.e., the relative position of the car in each frame). If composition is not preserved, the reframed video may have the car in the center of each cropped frame. Preserving the composition of a video frame-to-frame ensures that the artistic vision of the video creator in maintained from the original video to the reframed video after cropping.

Figure 3:
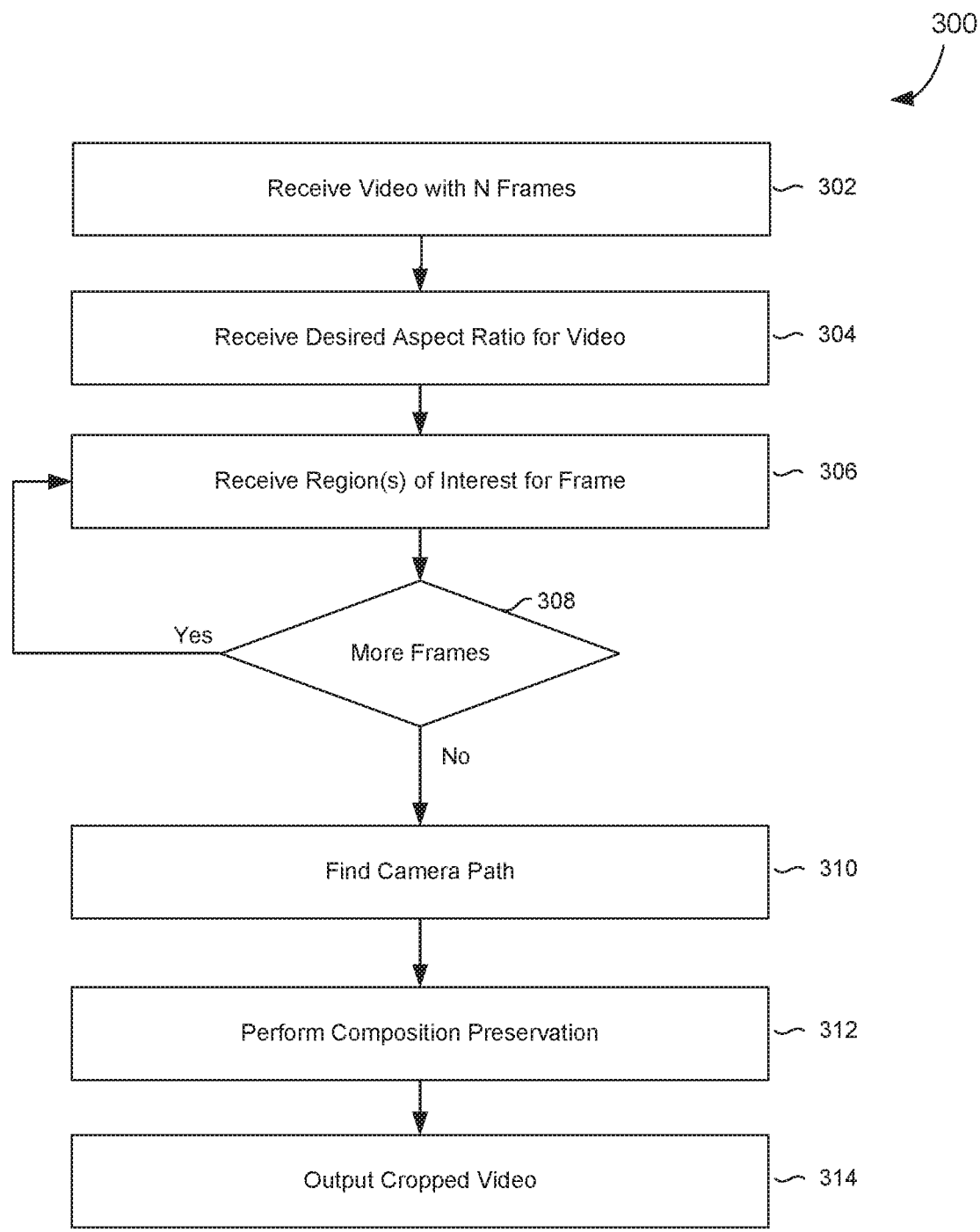
FIG. 3 depicts a process flow showing an embodiment of reframing a video from one aspect ratio to another aspect ratio, in accordance with various embodiments of the present disclosure.

Turning now to FIG. 3, a process flow is provided showing a method 300 depicting an example of reframing a video from one aspect ratio to another aspect ratio, in accordance with various embodiments of the present disclosure. Process flow 300 can be carried out, for example by a video reframing system as discussed with reference to FIGS. 1A, 1B, and 2.

As depicted, process flow 300 begins at block 302 where a video is received. Such a video can be received from, for example, data store 202 of FIG. 2 and/or from a database stored in the cloud. Videos can have any aspect ratio (e.g., 1:1, 4:3, 16:9, 1.85:1, 2:1, 2.35:1, 2.39:1, 2.4:1 9:16, etc.). The video can be comprised of N frames. A video frame is one of the many still images that comprise the complete moving picture of the video. The video plays by moving from one frame to another. The video can also contain jump cuts, which are transitions from one scene to another scene. Jump cuts can be identified in the video, for instance, using seam detection (e.g., using MPIC standards for detection based on significant changes in color histograms) or other techniques. When a jump cut is detected, each scene of the video can be treated as an individual video with N frames for generating a camera path.

At block 304, the desired aspect ratio for the video is determined. A desired aspect ratio can be selected or input in any manner. For example, a user can select the desired aspect ratio. Such a selection can be performed by indicating the desired aspect ratio for a video. Such a selection can also be performed by indicating a channel on which the video will be played. A channel can be any one of a specific social media platform, website, device, and/or any other interface (i.e., hardware and/or software) capable of playing videos.

Upon designating a channel, the aspect ratio related to the channel can automatically be determined and/or selected.

A region of interest for a frame in the video is determined at block 306. As indicated above, a region of interest can comprise an area of a frame that contains meaningful content and/or contains subject matter of the frame. Meaningful content can be designated as content that draws a user's eye to a portion of the video frame. For instance, in a video of a humming bird flying, the region of interest in a frame could be the area of the frame containing the humming bird. If the humming bird flies towards a flower in a frame, the humming bird on the left of the frame could be a region of interest and the flower on the right of the frame could be another region of interest. In such a case when there are multiple regions of interest in a frame, the region of interest that contains the maximal region of interest can be selected. A maximal region of interest can be the region of interest that is most related to the meaningful content and/or subject matter of the frame. In an embodiment, this can be designated as the most salient region in a frame (e.g., the area in a frame that is most likely to draw a user's eye). In the humming bird example, in an embodiment, the humming bird could be selected as the maximal region of interest because the movement of the humming bird is more likely to draw a user's eye than a static flower. In a further embodiment, the humming bird could be selected as the maximal region of interest because the video as a whole is about humming birds and not flowers. In still a further embodiment, the flower could be selected as the maximal region of interest because the video as a whole is about flowers and not humming birds. Different techniques to identify regions of interest and maximal regions of interest are discussed in further detail below.

At block 308, a determination is made as to whether there are more frames in the video. Region(s) of interest may be determined for all the frames in a video to generate a camera path. However, it should be appreciated that a portion of a video can be selected for reframing such that not every frame of an original video are reframed to the new aspect ratio. If the result of the determination at block 308 is that there are more frames, then processing returns to block 306. If the result of the determination at block 308 is that there are no more frames, then processing moves onto block 310.

At block 310, a camera path is determined for the video. A camera path can indicate the movement of sub crops from frame to frame in a video to create a video with the new aspect ratio. The camera path is generated by leveraging identified regions of interest for each frame to determine optimal cropped frames throughout the video that maintain regions of interest while minimizing unnecessary camera movement. The camera path can be generated using a single step process and/or a multi-step process.

In some conformations, an initial camera path is estimated using a region of interest determined for each frame of the video. In particular, an initial camera path can be generated by placing the sub crop for a frame based on the region of interest for the frame. The placement of a sub crop for a frame can be identified to optimize the region of interest within the visible window of the sub crop. Optimizing the region of interest can be performed by centering the region of interest in the sub crop. In embodiments, weighting can be applied to placement of a sub crop such that the sub crop is placed with the region of interest centered in the sub crop. Such weighting can be performed using a Gaussian function to prefer placement of the maximal region of interest near the center of the window of a sub crop. The initial camera path then traverses the video frame-to-frame based on the placement of the sub crops.

The estimated initial camera path may be modified to generate an optimal camera path. The optimal camera path can be based on minimizing unnecessary camera movement while ensuring the region of interest remains visible in the sub crop for each frame. The optimal camera path results in a path where the camera (e.g., visible region of a sub crop at each frame) moves just as much as necessary frame-to-frame, with appropriate acceleration, to keep the regions of interest visible throughout the reframed video. This optimal camera path can be formulated as a linear programming problem which minimizes an error function consisting of a first order derivative penalty, a second order derivative penalty, a third order derivative penalty, and proximity to the initial camera path estimate.

At block 312, composition preservation is performed. Composition of a frame can be identified based on the relative position of a region of interest in reference to the overall original frame. The composition of the original frame can be preserved by shifting the sub crop area of a frame to maintain the original composition. Preserving the composition frame-to-frame ensures that the artistic vision of the video creator is maintained for the overall video. Composition of frames can be performed automatically such that the sub crops are automatically shifted prior to cropping the video into the new aspect ratio.

After performing composition preservation, the video is cropped and output at block 314. For example, the placement of the sub crops determined to preserve composition can be used to crop the video. In cropping the video, the video is reframed to have the desired aspect ratio (e.g., as designated at block 304). In addition to cropping the video to the desired aspect ratio, the cropped video preserves the content and composition of the original video (i.e., having the original aspect ratio).

Figure 4:
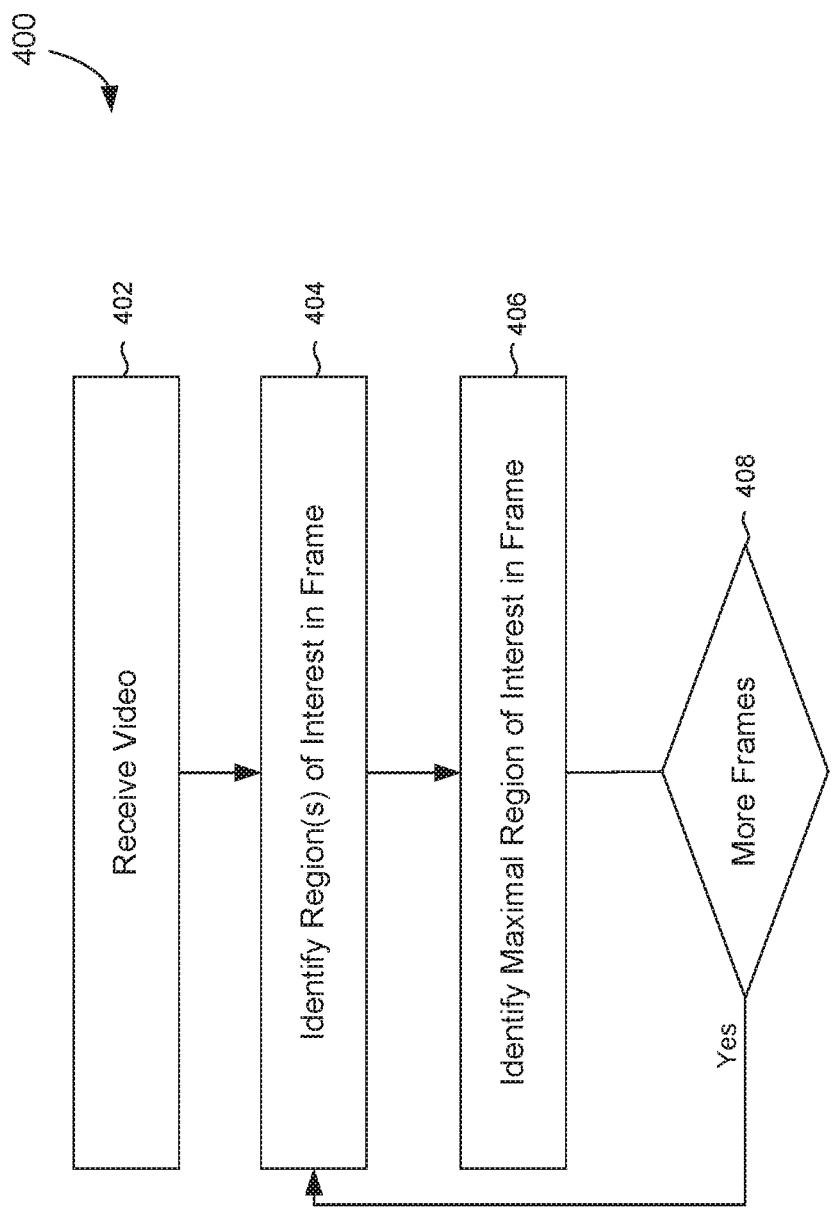
FIG. 4 depicts a process flow showing an embodiment of identifying a region(s) of interest in frames of a video, in accordance with various embodiments of the present disclosure.

FIG. 4 provides a process flow showing an embodiment of method 400 depicting an example of identifying a region (s) of interest in frames of a video, in accordance with various embodiments of the present disclosure. Such identification can be performed, for instance, using the video analysis engine 206 of video reframing system 204 as described with reference to FIG. 2.

At block 402, a video is received. Such a video can be received from, for example, a data store and/or from a database stored in the cloud. The video can be comprised of N frames. At least one region of interest is identified for a frame at block 404. A region of interest can comprise an area of a frame that contains meaningful content and/or contains subject matter of the frame. Meaningful content can be designated as content that draws a user's eye to the video frame. A region of interest can be identified in a variety of different manners in accordance with different implementations.

In particular, some embodiments identify regions of interest by identifying human faces. Human faces can be identified using, for example, a trained neural network (e.g., SSD ResNet Face detector from the OpenCV DNN module). Identified human faces can be designated as regions of interest using bounding boxes.

In other embodiments, a user can identify regions of interest (e.g., by selecting one or more objects in a video to identify in frames as regions of interest. Such identifications can take place using any manner of interactions to select an object with a user interface (e.g., tapping, clicking, circling, etc.). For example, if a video shows a person throwing a Frisbee to a dog, a user could select the person, the Frisbee, and the dog as objects to identify in frames as regions of interest. Upon identifying a region of interest in a frame, the region of interest can be propagated across additional frames having the same/similar region of interest. A user can also identify regions of interest based on gaze. For instance, gaze detection can be employed to determine where in a frame a user's gaze is focused. Gaze detection can be carried out using a camera installed in a system that is calibrated to track the gaze of a user while they are watching the video. Using this tracking, regions of interest can be determined for frames of a video.

In further embodiments, saliency can be used to identify regions of interest. Saliency can be defined as an area(s) in an image (e.g., frame of a video) determined to be likely to draw a user's eye. Saliency can be identified using, for example, a trained neural network that predicts where people look in images (e.g., Deepgaze II). In particular, pixels in a frame can be analyzed for saliency. The analyzed pixels can be used to generate a saliency map for each frame of the video. The saliency map can indicate the likelihood of saliency of the pixels that comprise a frame. In some embodiments, the saliency map can be represented using a binary approach with predicted salient pixels indicating the presence of a salient object. In other embodiments, the saliency map can be represented using scores (e.g., the higher the score, the more salient the pixel). For instance, in a video frame depicting a car driving in a desert, the pixels that comprise the car can indicate a high likelihood of saliency. In the same video frame, there can be a tree in the distance that can indicate lower level of saliency (i.e., a mid-to low level of saliency). In this way, the saliency map can indicate the region(s) of interest in a frame based on objects depicted in the frame that are likely to draw a user's eye.

At block 406, a maximal region of interest is identified for a frame. A maximal region of interest can be the region of interest that is most related to the meaningful content and/or subject matter of the frame. In some embodiments, when using saliency for regions of interest, the maximal region of interest can be designated as the most salient region in a frame (e.g., the area in a frame that is most likely to draw a user's eye). In particular, each frame of the video can have a saliency map indicating the likelihood of saliency for the pixels of the frame. The saliency map can be used to determine a region of the frame with the most saliency. In an embodiment, saliency of a region can be the sum of the predicted saliency for all pixels in a region. In this way, the area in a frame with the highest summed pixel saliency score has the highest saliency. The maximum salient region can be determined using a summed area table. A summed area table can contain the pixel saliency scores for a frame and can quickly and efficiently generate the sum of values in a rectangular subset of the frame. In this way, the summed area table can be used to determine the region of the frame with the highest summed saliency score.

At block 408, a determination is made as to whether there are more frames in the video. Region(s) of interest may be identified for all the frames in a video to generate a camera path as discussed further with reference to FIG. 5. If the result of the determination at block 408 is that there are more frames, then processing returns to block 404.

Figure 5:
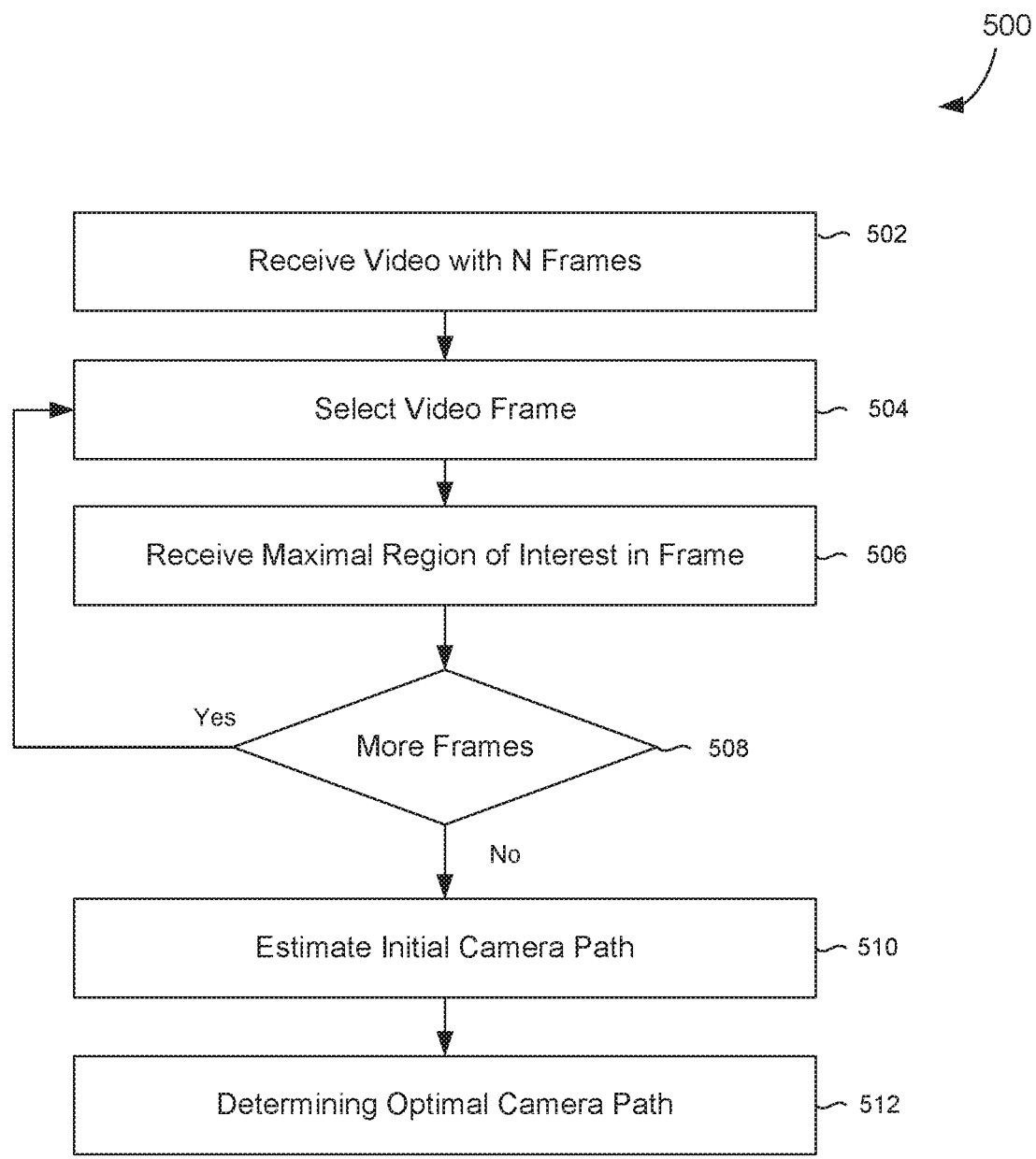
FIG. 5 depicts a process flow showing an embodiment of determining a camera path for a video, in accordance with various embodiments of the present disclosure.

FIG. 5 provides a process flow showing an embodiment of method 500 depicting an example of determining a camera path for a video, in accordance with various embodiments of the present disclosure. Such determination can take place using a camera path engine of a video reframing system as described with reference to FIG. 2.

At block 502, a video is received. The video can be comprised of N frames. Such a video can be received from, for example, a data store and/or from a database stored in the cloud. At block 504, a video frame is selected. At block 506, a maximal region of interest for the frame is determined. At block 508, a determination is made as to whether there are more frames in the video. Region(s) of interest can be determined for all the frames in a video to generate the camera path. If the result of the determination at block 508 is that there are more frames, then processing returns to block 504. If the result of the determination at block 508 is that there are no more frames, then processing moves onto block 510.

At block 510, an initial camera path is estimated. The initial camera path can be estimated using the maximal regions of interest determined for a frames of the video. In particular, an initial camera path can be generated by placing a sub crop for a frame based on a maximal region of interest for the frame. The placement of a sub crop for a frame can be identified to optimize the region of interest within the visible window of the sub crop. Optimizing the region of interest can be performed by centering the region of interest in the sub crop. In this way, when the video is cropped using the sub crop, the region of interest is centered within the cropped frame of the video. In one embodiment, weighting can be applied to placement of a sub crop such that the sub crop is placed with the region of interest centered in the sub crop. Such weighting can be performed using a Gaussian function to prefer placement of the maximal region of interest near the center of the window of a sub crop. The initial camera path then traverses the video frame-to-frame based on the placement of the sub crops.

At block 512, the estimated initial camera path is modified to generate an optimal camera path. The optimal camera path can be formulated to balance movement related to static shots, constant velocity panning, and smooth camera transitions while keeping the region of interest visible in each frame. This optimal camera path can be formulated as a linear programming problem which minimizes an error function consisting of a first order derivative penalty, a second order derivative penalty, a third order derivative penalty, and proximity to the initial camera path estimate. As an example, the following equation can be utilized:

$$\phi(P) = \omega_1 |\Delta P|_1 + \omega_2 |\Delta^2 P|_1 + \omega_3 |\Delta^3 P|_1 + \omega_d |P - P_e|_1$$

P is optimal path. $\Delta P$, $\Delta^2 P$, $\Delta^3 P$ are the first, second, and third derivatives and $|P - P_e|$ represents the distance between the desired optimal camera path and the initial camera path estimate. Weights $\omega_1$, $\omega_2$, $\omega_3$, and $\omega_d$ can be used to bias towards specific types of camera movement types. Camera movement types include static camera shots, constant velocity panning (e.g., linear translation), and smooth camera transitions (e.g., STEADICAM like motion). In particular, a higher $\omega_1$ biases towards more static shots. A higher $\omega_2$ biases towards more constant velocity panning. A higher $\omega_3$ biases towards smoother camera transitions. Finally, a higher $\omega_d$ biases towards staying closer to the initial path.

Weighting can be used to bias towards a particular type of camera movement. Biasing towards a type of camera movement ensures that the camera path has one type of movement at a time. Weighting can also be applied to encourage the optimal camera path to adhere to the data from the initial camera path estimate. Further, biasing towards a type of camera motion allows for camera movement to be applied during video reframing in a manner best suiting the content of the video. For instance, if the video is a simple cooking video without a lot of action, bias towards movement could result in constant camera shifting around the subject; whereas, bias towards static shots (e.g., similar to a camera on a tripod) could result in a more stable reframed video focused on the subject (e.g., as indicated by regions of interest in each frame).

Weights can be adjusted to preference one type of camera movement over another. In some embodiments, the adjustment can be manually performed by a user, for instance, by the user specifying a specific type of movement for the video. In further embodiments, the adjustment can be automatically performed. Automatic weighting can be based on, for example, a category of a video. A category of a video can be indicative of the dominant type of movement in the video (e.g., such that static shots, constant velocity shots, and/or panning between static and constant velocity). Categories of a video can be input by a user, identified by parsing a video description, and/or using machine learning trained for identification. For instance, for parsing a video transcription, a NLP classifier can be trained based on a deep net or BOW model. In another instance, given a sufficient amount of training data, a classifier can be trained based on motion and pixel data in video frames to determine a video category based on the video data stream.

In an embodiment, weights determined for a video can be applied to a subsequent video. For instance, if a user films multiple video clips that comprise an overall video project. A clip can be used to determine weighting that can be applied to all the clips in the video project. Such an embodiment can be applied when the original video clips are filmed using the same aspect ratio with the same/similar content. As an example, if the multiple video clips are all of F1 cars in an overall video project about the Monaco Grand Prix, the weights that are biased towards the action heavy content in one video clip can be applied to other video clips in the video project. Using previously determined weights can increase computational efficiency in determining the optimal camera path.

This equation can be optimized to minimize loss, where loss is based on unnecessary camera movement. In other words, camera movement should be minimized unless necessary to keep a region of interest in the sub crop. It is also undesirable to lose the region of interest from visibility in a sub crop. The optimal solution is found by moving the camera just as much as is needed, having the acceleration (e.g., velocity) required to maintain the region of interest in the cropped frame. When movement, acceleration, and maintaining regions of interest in a frame are balanced, the optimization equation has a low score indicating an optimal camera path. Loss can be minimized using various methods. In one embodiment, the solution that on average gives a min norm can be determined to have minimal loss. In other embodiments, a L1 norm can be used which gives a solution with minimal loss that has a set of weights that are sparse.

Further, as an example, the following equations can be utilized:

$$d(t) = \arg\max_i s(t, i)$$

$$\left| \omega_1 \left[ \frac{\delta p}{\delta t} \right] + \omega_2 \left[ \frac{\delta^2 p}{\delta t^2} \right] + \omega_3 \left[ \frac{\delta^3 p}{\delta t^3} \right] + \omega_d \sum_{t \in T} |p(t) - d(t)| \right|_1$$

p(t) is the position of an optimal path p at time t. T is the set of all frames in a video. d(t) is the position of the maximal-saliency path. s(t, i) is the saliency at frame t, position i (when saliency is used to indicate regions of interest). As discussed previously, $\omega_n$ are the algorithm weights that control the various aspects of camera motion. When using saliency to indicate regions of interest in frames, the maximal-saliency path can be precomputed at optimization time such that it is a constant.

Figure 6:
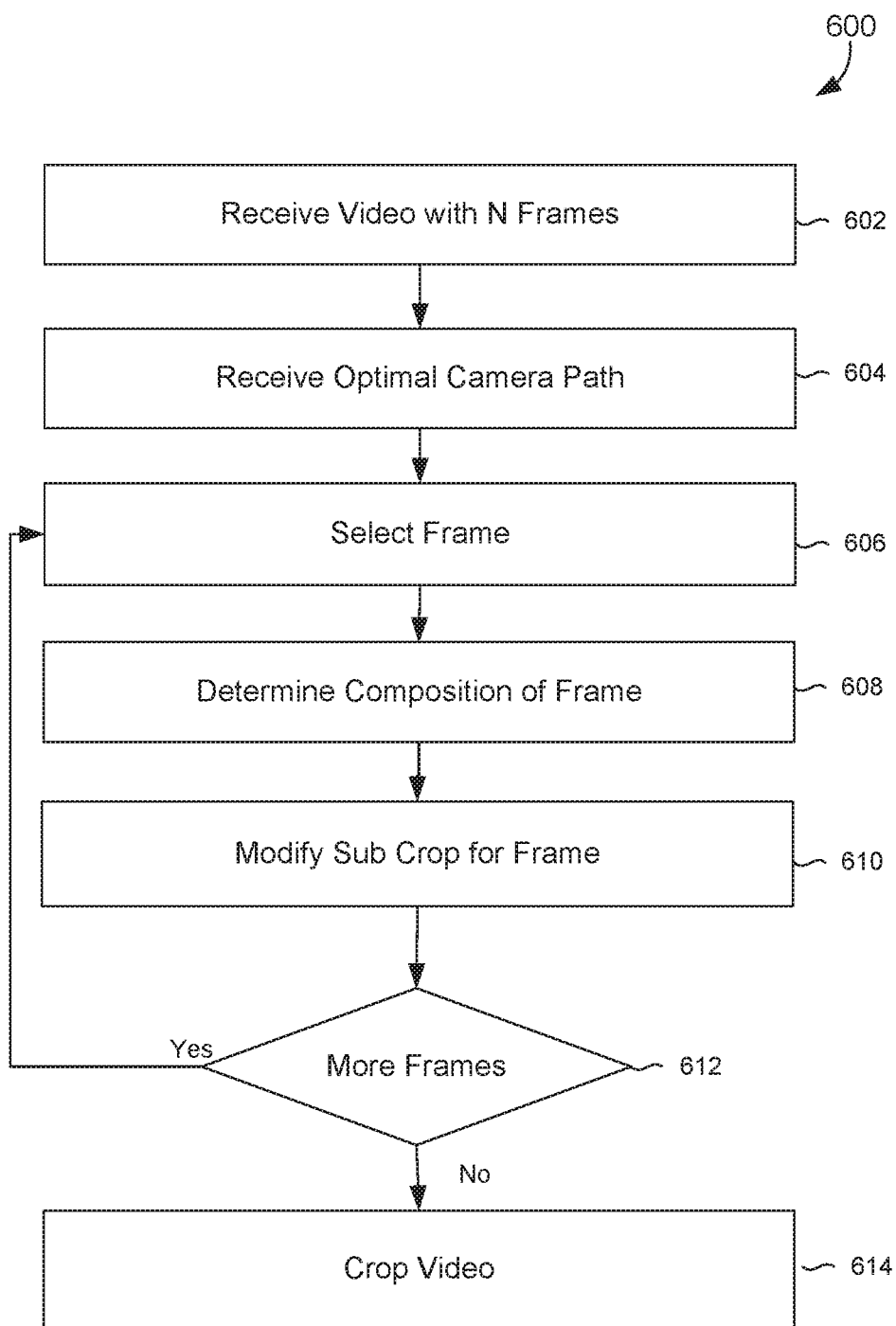
FIG. 6 depicts a process flow showing an embodiment of performing cropping with composition preservation, in accordance with various embodiments of the present disclosure.

FIG. 6 provides a process flow showing an embodiment of method 600 depicting an example of performing cropping with composition preservation, in accordance with various embodiments of the present disclosure. Such cropping and composition preservation can be performed, for instance, using cropping engine 210 of video reframing system 204 as described with reference to FIG. 2.

At block 602, a video is received. Such a video can be received from, for example, a data store and/or from a database stored in the cloud. The video can be comprised of N frames. At block 604, an optimal camera path is determined for the video. The optimal camera path can be determined by balancing camera shot types—static shots, constant velocity panning, and smooth camera transitions—while keeping the region of interest visible in each frame.

At block 606, a video frame is selected from the video. This selection can be performed automatically. At block 608, composition of the frame is determined. The composition of a frame can be identified using the relative position of the region of interest in reference to the overall original frame. Upon determining the composition of the original frame, at block 610, the sub crop may be modified for the frame. In particular, the sub crop area of a frame can be shifted from the visible window identified using the optimal camera path to a visible window that preserves the original composition. For instance, when an object in the frame is in the bottom third of the original frame, this will be preserved in the final cropped frame.

At block 612, a determination may be made as to whether there are more frames in the video. If the result of the determination at block 612 is that there are more frames, then processing returns to block 606. If the result of the determination at block 612 is that there are no more frames, then processing moves onto block 614. At block 614, the video is cropped. Cropping can be performed by applying the sub crops to the original frames. Applying the sub crops to the frames, reframes the frames from the original aspect ratio to the desired aspect ratio.

Figure 7:
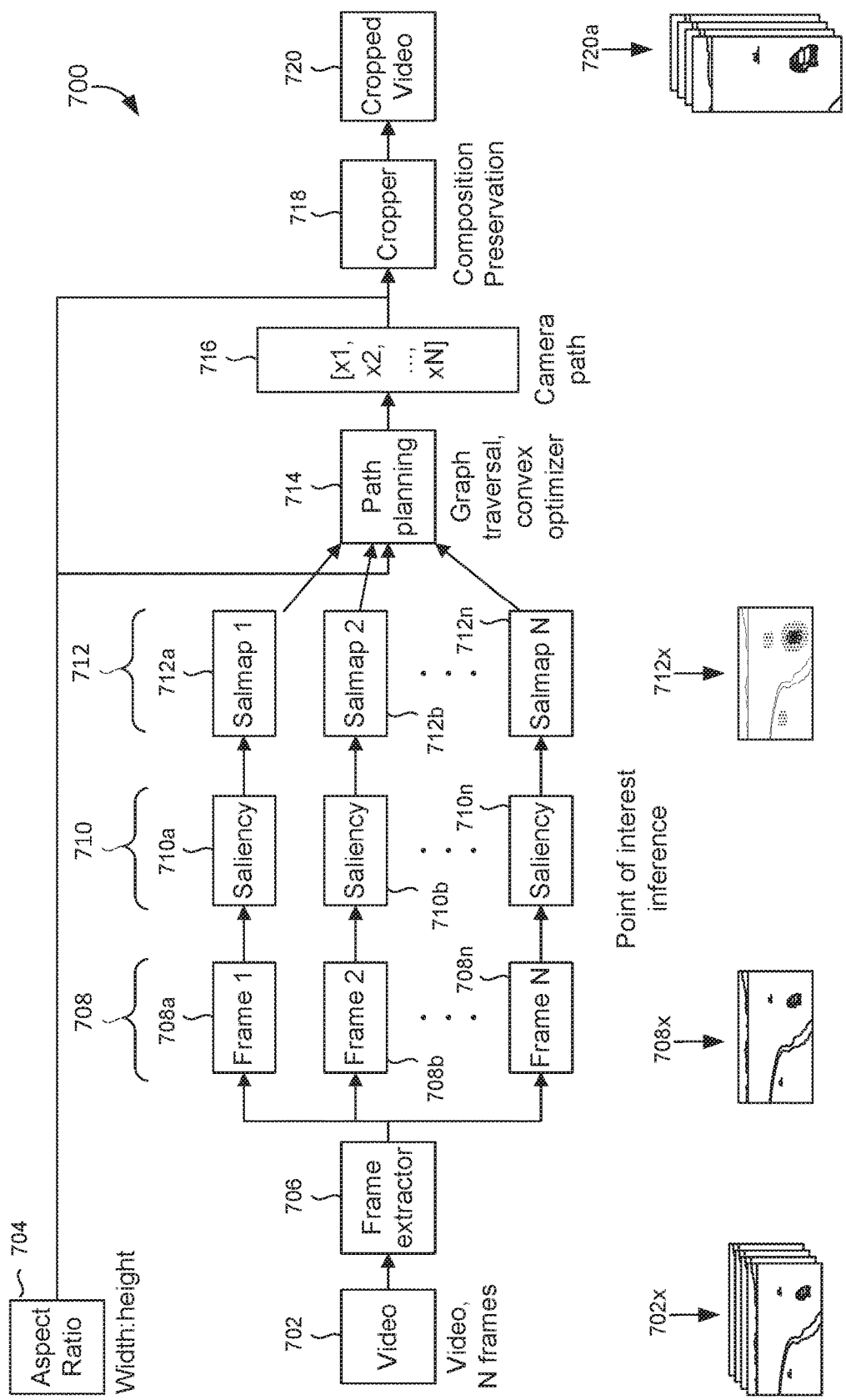
FIG. 7 illustrates an example environment that can be used for a reframing video system to reframed videos, in accordance with embodiments of the present disclosure.

FIG. 7 illustrates an example environment that can be used for reframing video system 700 to reframe videos, in accordance with embodiments of the present disclosure. Video 702 can be input into reframing video system 700. As depicted, video 702 relates to a car driving in a desert (as displayed in video 702x). The original aspect ratio of the video is horizontal (e.g., 16:9). The reframing video system can receive an indication of desired aspect ratio 704 for the video (e.g., portrait or 9:16).

Frame extractor 706 of the reframing video system extracts the N frames 708 (e.g., 708a, 708b, . . . , 708n) from the video. As depicted frame 708x depicts the car driving to the right of a road. Saliency 710 is analyzed for each of the N frames (e.g., 710a, 710b, . . . , 710n). The saliency analysis can determine saliency scores for the pixels in a frame of video 702.

The saliency analyses can be used to generate saliency maps (e.g., 712a, 712b, . . . , 712n) for each frame. For example, saliency map 712x depicts high saliency at the location of the car and very low saliency for the bushes in the frame. Using the saliency maps, a maximal region of interest can be determined for each frame. For instance, a summed area table can be used to quickly sum all saliency values in a salient map for a frame to identify a region with the maximal summed saliency. As depicted, the car in the frame is the maximal region of interest.

Figure 8A:
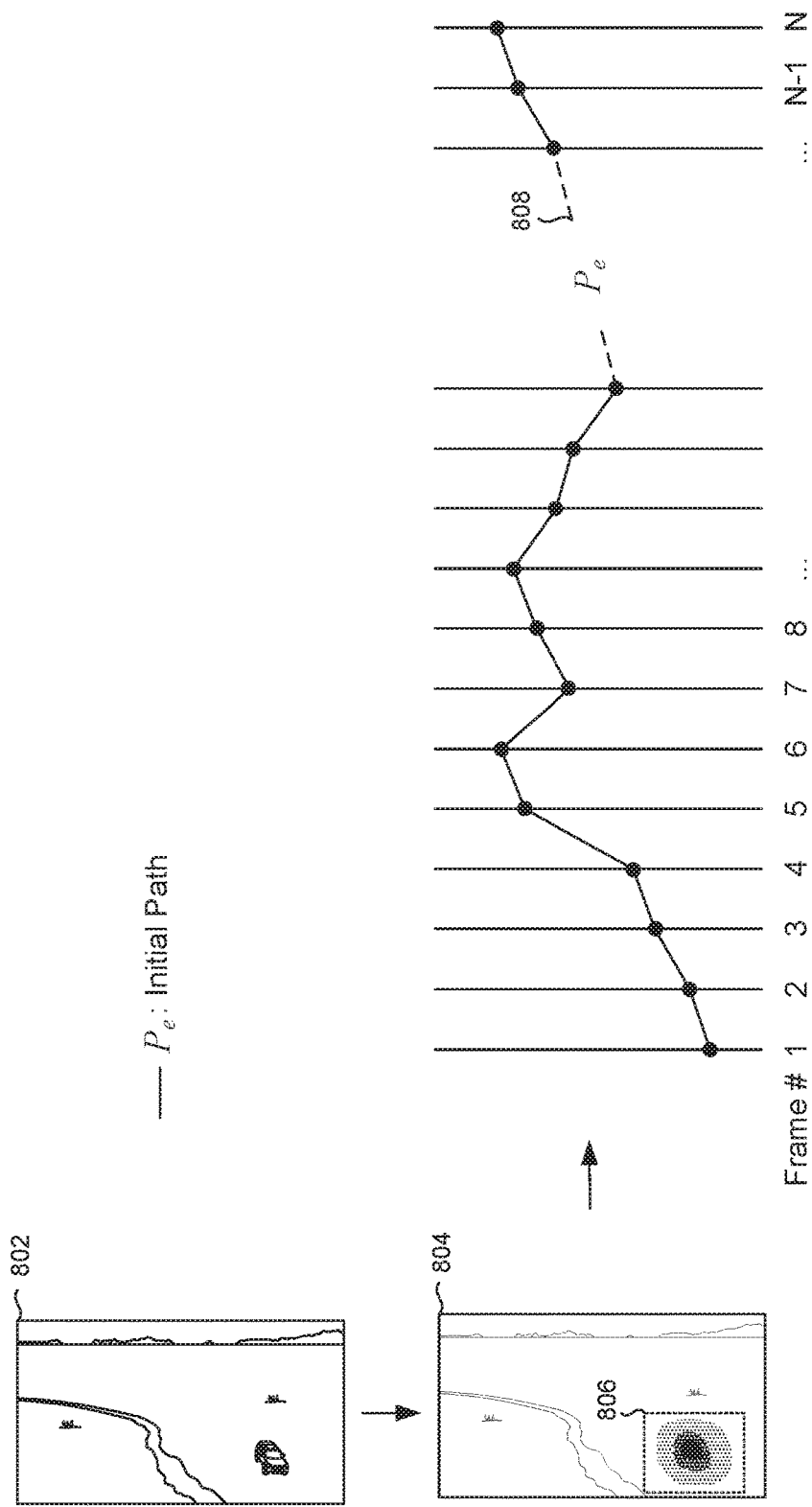
FIG. 8A illustrates an example estimated initial camera path for a video, in accordance with embodiments of the present disclosure.

The maximal regions of interest identified for the N frames are connected using an initial camera path estimate using path planning 714. In particular, the initial camera path can be generated by identifying coordinates in each frame at which to place a sub crop based on a maximal region of interest for the frame. Path planning 714 can be performed using graph traversal and an optimizer (e.g., convex optimizer). Graph traversal includes determining the initial camera path being computed as a traversal of the graph composed of the regions of interest for each frame (e.g., the graph composed of all the salient maps of each frame). FIG. 8A illustrates an example estimated initial camera path for a video, in accordance with embodiments of the present disclosure. In particular, FIG. 8A depicts frame 802 from a video being converted into salient map 804 for frame 802. The salient maps for the frames of the video are then used to determine an initial camera path estimate. The initial camera path estimate cane indicate the coordinates in each frame at which to place a sub crop based on a maximal salient region in the frame. For instance, salient map 804 shows that region 806, where the car is located, is the most salient region in frame 802. Salient maps for each frame in the video can be leveraged to generate initial camera path 808. Initial camera path 808 can be generated based on the coordinates in each frame having the maximal saliency for the frame. These coordinates can then be used to place a sub crop for each frame.

Optimal camera path 716 can then be determined from the initial camera path estimate. For instance, an optimizer determined at path planning 714 can be used to determine the optimal camera path 716. This optimal placement is based on minimizing unnecessary camera movement while maintaining visibility of the regions of interest in sub crops. In particular, the optimal camera path can be formulated to balance movement related to static shots, constant velocity panning, and smooth camera transitions while keeping the region of interest visible. For instance, the video of FIG. 7, contains a constantly moving car. As such, constant velocity shots are likely to be preferred. This ensures smooth movement frame-to-frame following the car as it moves from left to right across the frames in the video.

Figure 8B:
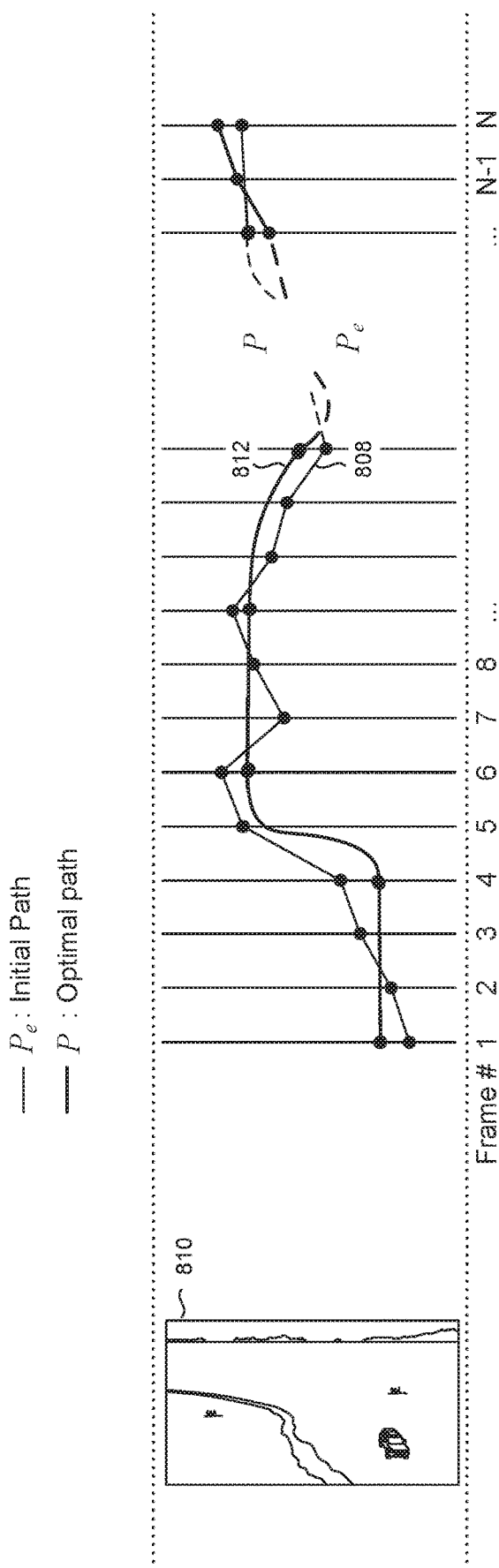
FIG. 8B illustrates an example estimated initial camera path and optimal camera path for a video, in accordance with embodiments of the present disclosure.

FIG. 8B illustrates an example estimated initial camera path and optimal camera path for a video, in accordance with embodiments of the present disclosure. In particular, FIG. 8B depicts video 810 with N frames, one of which is frame 802. Initial camera path 808 can be generated based on the coordinates in each frame having the maximal saliency for the frame such that sub crops can be placed for each frame using the coordinates. Initial camera path 808 can undergo optimization to generate optimal camera path 812. Optimal camera path 812 can be formulated to balance movement related to static shots, constant velocity panning, and smooth camera transitions while keeping the region of interest visible in each frame. As depicted, this optimization results in smoother camera path (e.g., compare initial camera path 808—$P_e$—with optimal camera path 812—P. Optimal camera path removed unnecessary jumps between placement of the sub crops which can result in a more cohesive cropped video.

The placement of a sub crop can be further modified using composition preservation 718. When performing composition preservation, the composition of a frame is identified based on the relative position of the region of interest in reference to the overall original frame. For instance, in the original video, the car is traveling from left to right. As the video is reframed to a new aspect ratio, the movement of the car traveling left to right will be maintained by preserving the composition of the car each frame.

Finally cropped video 720a can be generated. Video 720a depicts a final cropped video with N frames. Video 720a has an aspect ratio based on desired aspect ratio 704. In addition having the desired aspect ratio, cropped video 720a preserves the content and composition of original video 702.

Figure 9:
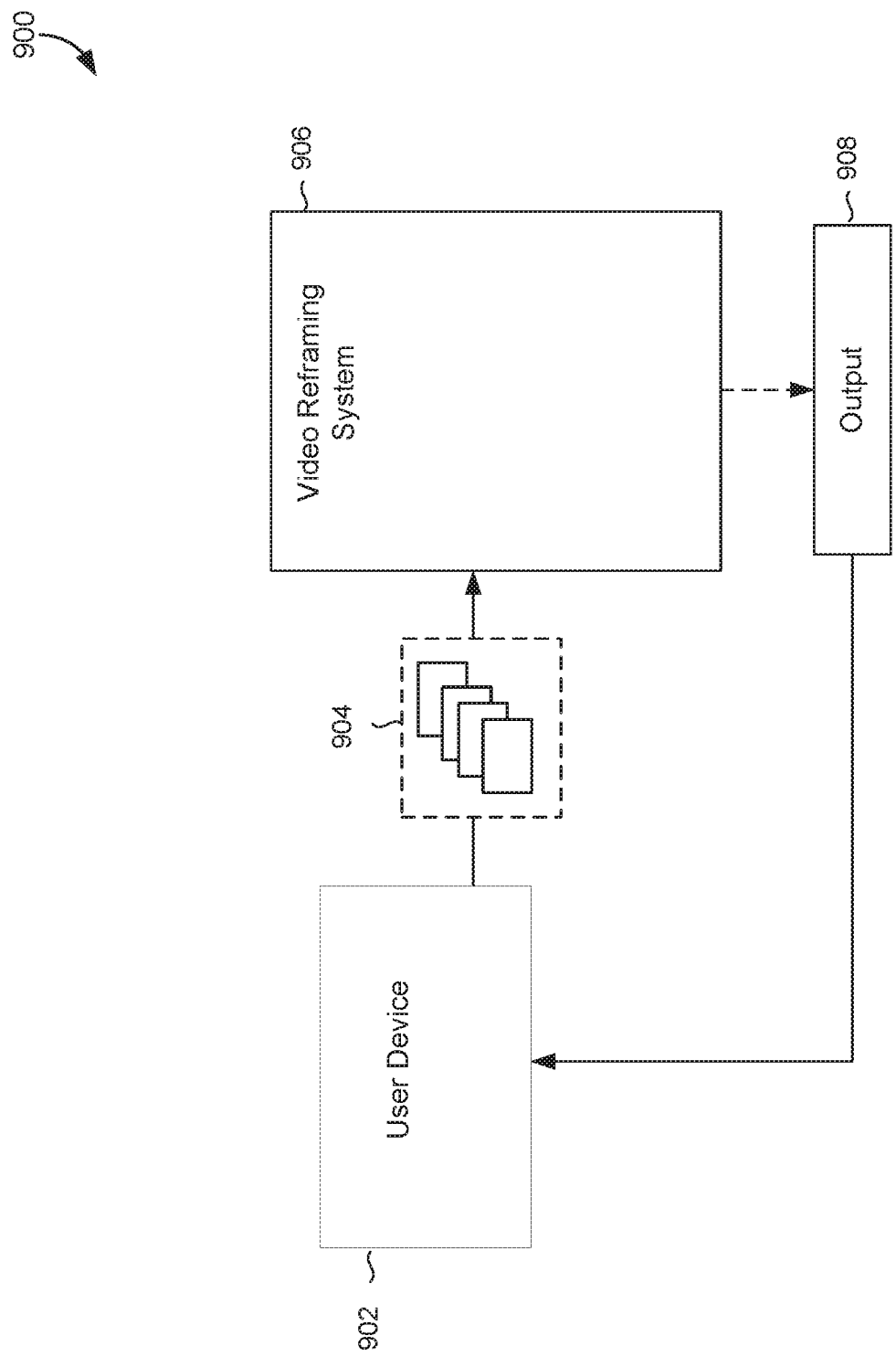
FIG. 9 illustrates an example environment 900 that can be used for reframing videos, in accordance with embodiments of the present disclosure.

FIG. 9 illustrates an example environment 900 that may be used for reframing videos, in accordance with embodiments of the present disclosure. In particular, videos can be reframed using a server-side processing system (e.g., video reframing system 906). Video reframing system 906 can be run as a service provider for processing videos. In this way, users can select videos to send into the video reframing system. For instance, user device 902 can be used to select video 904. Video 904 can be sent to video reframing system 906 for reframing from one aspect ratio to another aspect ratio (e.g., a desired aspect ratio). The video reframing system can be used to determine an optimal camera path for video 904 based on a desired aspect ratio. Video reframing system can output the optimal camera path, coordinates to place sub crops around, and/or a reframed video with the desired aspect ratio. Output 908 can be sent back to user device 902. The output can be presented as a suggestion to a user. For instance, the camera path can be presented to the user in such a manner that the user can modify the suggested reframed video. As an example, the weights of the parameters (e.g., the first order derivative, the second order derivative, the third order derivative, and/or proximity to the initial camera path) can be adjusted by the user if the cropped video does not reflect a desired reframed video. Adjustment of the weights can be manually performed. A further suggestion output can be presenting the reframed video to a user frame-by-frame.

Figure 10:
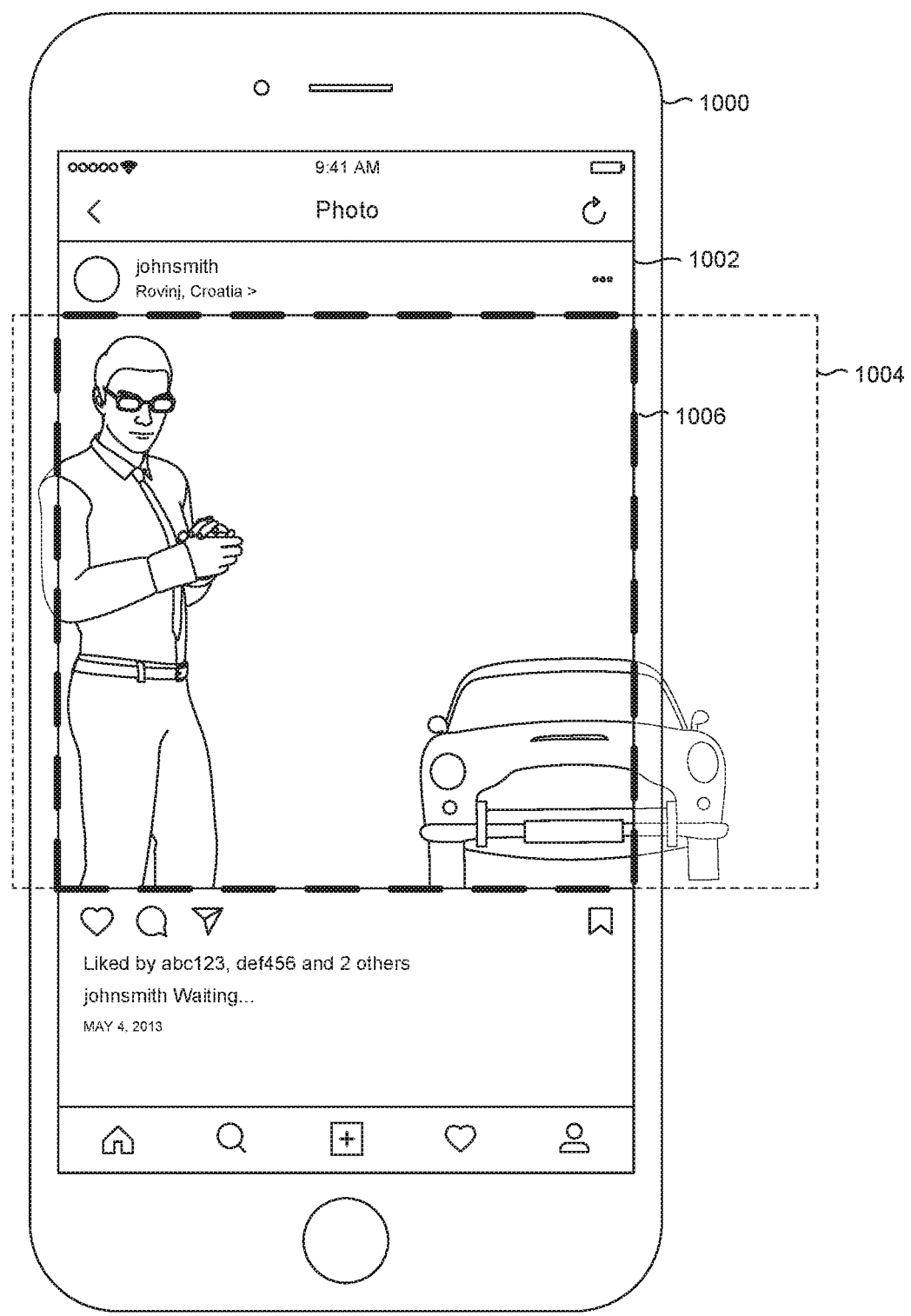
FIG. 10 depicts an example of a video reframed for a particular channel, in accordance with embodiments of the present disclosure.

FIG. 10 depicts an example of a video reframed for a particular channel, in accordance with embodiments of the present disclosure. A channel can be any one of a social media platform, website, device, and/or any other interface (i.e., hardware and/or software) capable of playing videos. As depicted, the channel is displayed on device 1000. In particular, the channel is social media platform 1102 requiring a square aspect ratio (e.g., 1:1). Original video 1004 had a horizontal aspect ratio (e.g., 16:9). Reframed video 1006 maintains the composition of original video 1004 with the person in the left third of the frame.

Figure 11:
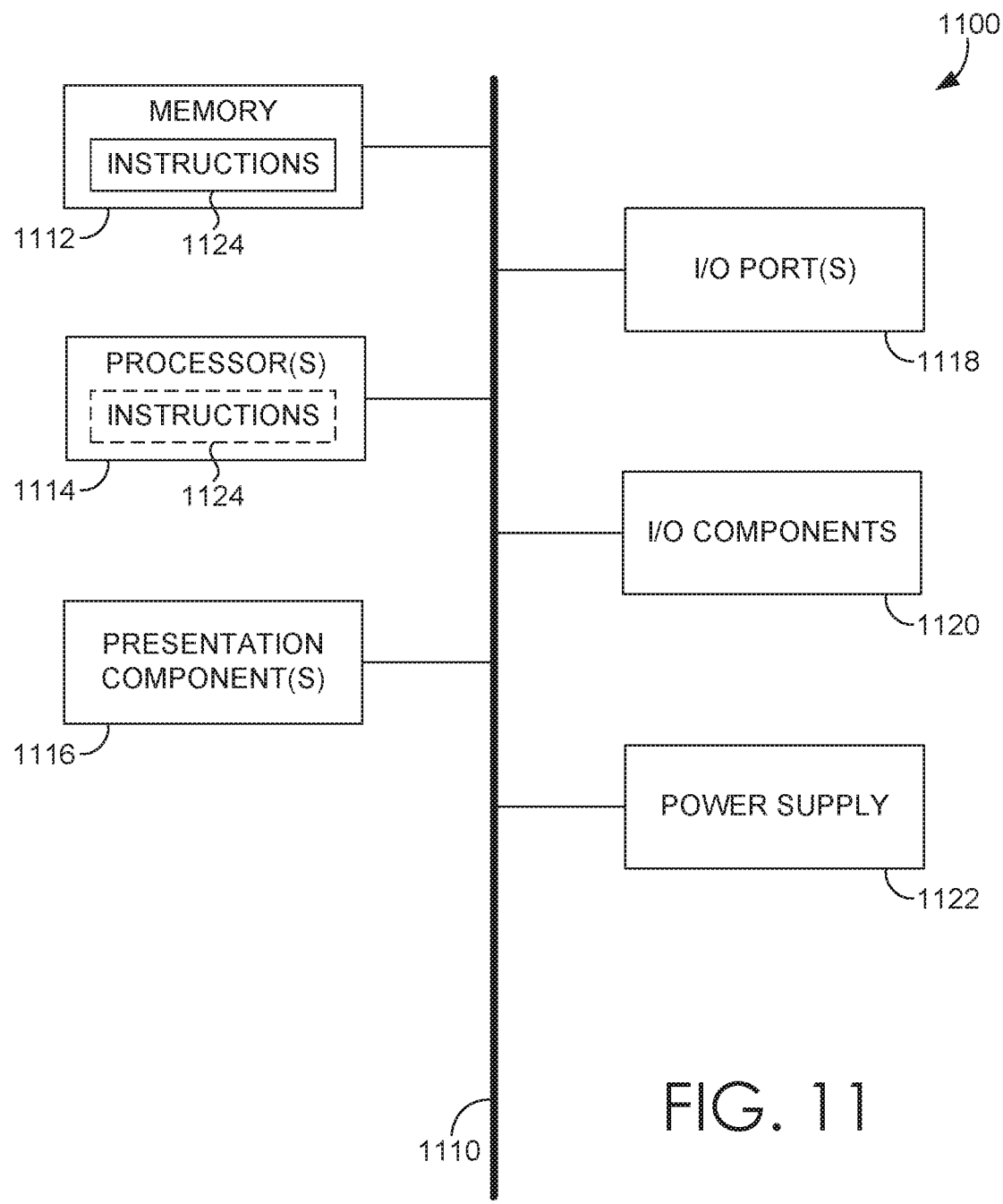
FIG. 11 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   identifying regions of interest corresponding to frames of a video;
   determining a camera path based on the regions of interest and an application of a first weighting to locations of the regions of interest in the frames of the video and a second weighting to one or more types of camera movement across the frames of the video;
   positioning sub crops on the frames of the video based on the determined camera path;
   performing composition preservation that includes shifting at least one sub crop based on a composition of a corresponding frame comprising a relative position of a first region of interest within the corresponding frame; and
   generating a cropped video by cropping the frames of the video based on the positioned sub crops.

2. The computer-implemented method of claim 1, further comprising:
   identifying the sub crops of the frames of video based on the camera path.

3. The computer-implemented method of claim 1, wherein generating the cropped video includes cropping the frames of videos based on the sub crops.

4. The computer-implemented method of claim 1, further comprising:
   presenting the cropped video for display.

5. The computer-implemented method of claim 1, wherein the one or more types of camera movement comprise: static shots, constant panning shots, and constant acceleration transition shots.

6. The computer-implemented method of claim 1, wherein an initial camera path is weighted to center at least one region of interest from at least one frame in a corresponding sub crop.

7. The computer-implemented method of claim 1, further comprising:
   providing an output suggestion to a user, the output suggestion comprising at least one of the camera path, the sub crops, and the cropped video.

8. The computer-implemented method of claim 1, wherein the video is a portion of a larger video, the portion automatically determined using detected jump cuts in the larger video that indicate a transition from one scene to another scene.

9. One or more computer storage media storing computer-useable instructions that, when used by one or more computing devices, cause the one or more computing devices to perform operations comprising:
   receiving a first video that has a first aspect ratio;
   identifying a second video within a portion of the first video based on employing jump cuts in the first video that indicate a transition from one scene to another scene, wherein the second video has the first aspect ratio;

identifying a set of regions of interest corresponding to frames of the second video;

estimating a first camera path on the second video from the set of regions of interest corresponding to the frames of the second video;

determining a second camera path on the second video based on minimizing an error function for a type of movement and proximity to the estimated first camera path on the second video;

identifying sub crops of the second video that have a second aspect ratio, which is different from the first aspect ratio of the second video, wherein the sub crops are positioned on the second video based on the second camera path; and generating a cropped video that has the second aspect ratio based on the identified sub crops of the second video.

10. The one or more computer storage media of claim 9, wherein the operations further comprise:
presenting the cropped video for display.

11. The one or more computer storage media of claim 9, wherein the operations further comprise:
prior to generating the cropped video, performing composition preservation on the second video, wherein the composition preservation shifts at least one sub crop of the second video based on a composition of a corresponding original frame of the second video.

12. The one or more computer storage media of claim 9, wherein the operations further comprise:
identifying a first region of interest corresponding to a first frame of the second video based on a saliency mapping for the first frame to find a second region of interest corresponding to the first frame.

13. The one or more computer storage media of claim 9, wherein the type of movement is determined using weighting for one or more of the following:
static shots, constant panning shots, and constant acceleration transition shots.

14. The one or more computer storage media of claim 9, wherein the operations further comprise:
employing one or more of a human face, a user selected object, or a salient area to identifying the set of regions of interest is one or more of a human face, a user selected object, and a salient area.

15. The one or more computer storage media of claim 9, wherein the operations further comprise:
weighting the first camera path on the second video to center at least one region of interest of the set of regions of interest in a corresponding sub crop of the sub crops.

16. The one or more computer storage media of claim 9, wherein the operations further comprise:
providing an output suggestion that includes at least one of the second camera path on the second video, the sub crops, or the cropped video with the second aspect ratio.

17. The computing system of claim 16, the actions further comprising:
identifying a first region of interest across the video, the first region of interest identified using saliency mapping for a first frame of the video to find a region of interest for the first frame.

18. A computing system comprising:
a processor device; and
a computer-readable storage medium, coupled with the processor device, having instructions stored thereon which, when executed by the processor device, perform actions comprising:
estimating a camera path from a set of regions of interest corresponding to frames of a video with a first aspect ratio; and
generating a cropped video based on sub crops of the video with a second aspect ratio, the sub crops being placed on the frames of the video using the estimated camera path, wherein at least one sub crop is shifted by performing composition preservation that includes shifting the at least one sub crop based on a composition of a corresponding frame comprising a relative position of a first region of interest within the corresponding frame.

* * * * *